United States Patent
Van der Pol

[11] Patent Number: 5,918,285
[45] Date of Patent: Jun. 29, 1999

[54] CORIOLIS MASS FLOW METER HAVING A THICK-WALLED MEASURING TUBE

[75] Inventor: Ronald Van der Pol, Venlo, Netherlands

[73] Assignee: Krohne Messtechnik GmbH & Co., KG, Germany

[21] Appl. No.: 08/981,938

[22] PCT Filed: May 20, 1997

[86] PCT No.: PCT/EP97/02556

§ 371 Date: Dec. 30, 1997

§ 102(e) Date: Dec. 30, 1997

[87] PCT Pub. No.: WO97/44640

PCT Pub. Date: Nov. 27, 1997

[30] Foreign Application Priority Data

May 20, 1996 [DE] Germany ............................ 19620079

[51] Int. Cl.[6] .................................................. G01F 1/84
[52] U.S. Cl. ............................................... 73/861.357
[58] Field of Search ...................... 73/861.355, 861.356, 73/861.357

[56] References Cited

U.S. PATENT DOCUMENTS

| | | | |
|---|---|---|---|
| 4,949,583 | 8/1990 | Lang et al. | 73/861.357 |
| 5,048,351 | 9/1991 | Dames . | |
| 5,392,656 | 2/1995 | Lew et al. . | |
| 5,398,554 | 3/1995 | Ogawa et al. | 73/861.357 |

FOREIGN PATENT DOCUMENTS

| | | | |
|---|---|---|---|
| 0379799 | 8/1990 | European Pat. Off. | 73/861.357 |
| 41 19 396 C1 | 6/1991 | Germany . | |
| 41 24 295 C2 | 7/1991 | Germany . | |
| 41 43 361 A1 | 7/1991 | Germany . | |
| 42 24 379 C1 | 7/1992 | Germany . | |
| 196 01 342 | 1/1996 | Germany . | |

OTHER PUBLICATIONS

Zulassung des Corimass G–Gerates zum eichpflichtigen Verkehr, Krohne Messtechnik GmbH & Co., KG (Mar. 22, 1994) 4 pages.

Primary Examiner—Harshad Patel
Attorney, Agent, or Firm—Cesari and McKenna, LLP

[57] ABSTRACT

A mass flow meter for flowing media, which operates according to the Coriolis principle, has a straight Coriolis measuring tube, an oscillation generator acting on the Coriolis measuring tube, and at least one sensor detecting Coriolis forces and/or Coriolis oscillations based on Coriolis forces. The problem which results from the fact the mass flow meter has only one straight Coriolis measuring tube is largely eliminated by designing the Coriolis measuring tube as a flow channel of a thick-walled body, namely a thick-walled tube, the thick-walled tube having recesses accessible from the outside and reaching very close to the Coriolis measuring tube. The oscillation generator acts upon the residual material of the thick-walled tube remaining in the area of the recesses, and the Coriolis forces or Coriolis oscillations appearing in the area of the residual material of the thick-walled tube are detected by each sensor.

10 Claims, 6 Drawing Sheets

CORIOLIS MASS FLOW METER HAVING A THICK-WALLED MEASURING TUBE

The invention concerns a mass flow meter for flowing media, which operates according to the Coriolis principle, with one at least essentially straight Coriolis measuring tube, with at least one oscillation generator acting on the Coriolis measuring tube, and with at least one sensor detecting Coriolis forces and/or Coriolis oscillations based on Coriolis forces.

BACKGROUND OF THE INVENTION

Mass flow meters for flowing media, which operate according to the Coriolis principle, are known in different designs (cf. e.g. German Patent Specification 41 24 295 and German Offenlegungsschrift 41 43 361 and the publications cited there in each case in column 1, lines 20 to 27, German Patent Specification 42 24 397 and the publications cited there in column 1, lines 23 to 30, as well as German Offenlegungsschrift 196 01 342) and have been increasingly used in practice for some time.

In the case of mass flow meters for flowing media, which operate according to the Coriolis principle, basically, there are, on the one hand, those whose Coriolis measuring tube is made at least essentially straight, as a rule exactly straight, and, on the other hand, those whose Coriolis measuring tube is made loop-shaped. In addition, in the case of the mass flow meters under discussion, there are, on the one hand, those which have only one Coriolis measuring tube and, on the other hand, those which have two Coriolis measuring tubes. In the case of the embodiments with two Coriolis measuring tubes, they can be hydraulically in series or parallel to one another.

Mass flow meters of the type in question, in the case of which the Coriolis measuring tube is, or the Coriolis measuring tubes are, made straight, with respect to their mechanical construction are simple and can consequently be produced at relatively low cost. In this case, it is also possible to finish or polish the inner surfaces of the Coriolis measuring tube or Coriolis measuring tubes well; they can be polished easily. In addition, they have a relatively low pressure loss. In the case of mass flow meters which operate according to the Coriolis principle, and whose Coriolis measuring tube is made straight, or the Coriolis measuring tubes are made straight, it can be disadvantageous that both thermally caused expansions or stresses, as well as forces and moments acting from outside, can lead to measurement errors and to mechanical damage, namely stress cracks.

The experts have already dealt with the above-mentioned problems in mass flow meters with straight Coriolis measuring tubes (cf. in particular German Patent Specification 41 24 295, German Offenlegungsschrift 41 43 361, and German Patent Specification 42 24 379). Altogether, a mass flow meter operating according to the Coriolis principle, with a straight Coriolis measuring tube, which has a measurement error of only about 0.1% (cf. the prospectus "Zulassung des Corimass G-Gerätes zum eichpflichtigen Verkehr" of the KROHNE Meßtechnik GmbH & Co. KG), was made successfully.

Mass flow meters operating according to the Coriolis principle, which have only one straight Coriolis measuring tube, have considerable advantages as compared with those mass flow meters which have either two straight Coriolis measuring tubes or one loop-shaped Coriolis measuring tube. The advantage as compared with mass flow meters with two straight Coriolis measuring tubes in particular is to be seen in the fact that flow separators or flow combiners, which are required in the case of mass flow meters with two Coriolis measuring tubes, are not needed. The advantage as compared with flow meters with one loop-shaped Coriolis measuring tube, or with two loop-shaped Coriolis measuring tubes, in particular is to be seen in the fact that a straight Coriolis measuring tube is easier to produce than a loop-shaped Coriolis measuring tube, that the pressure drop in the case of a straight Coriolis measuring tube is less than in the case of a loop-shaped Coriolis measuring tube, and that a straight Coriolis measuring tube can be cleaned better than a loop-shaped Coriolis measuring tube.

However, mass flow meters which operate according to the Coriolis principle and have one straight Coriolis measuring tube, also have a physically, or mechanically, predetermined disadvantage (cf. European Offenlegungsschrift 0 521 439).

Mass flow meters operating according to the Coriolis principle require that the Coriolis measuring tube be put into oscillation by means of at least one oscillation generator; the Coriolis forces, or the Coriolis oscillations, do indeed result from the fact that the Coriolis measuring tube oscillates and from the flowing of mass through the Coriolis measuring tube.

In the case of mass flow meters with two straight Coriolis measuring tubes, or with one loop-shaped Coriolis measuring tube, or with two loop-shaped Coriolis measuring tubes, the Coriolis measuring tubes, or the parts of the loop-shaped Coriolis measuring tubes causing oscillation, are designed identically and located and excited into oscillation so that they oscillate opposite one another. This has the positive consequence that the oscillating system as a whole is not acting as such outwards. The position of the center of mass remains constant and forces which appear are compensated. Consequently, no oscillations are introduced into the pipeline system in which this mass flow meter is installed, and oscillations of the pipeline system do not influence the measurement result.

In the case of mass flow meters operating according to the Coriolis principle, which have only one straight Coriolis measuring tube, the positive consequence of Coriolis measuring tubes oscillating opposite one another, explained above, naturally does not occur. The center of mass does not remain constant and forces which appear are not compensated. The consequence of this is, on the one hand, that oscillations are transferred into the pipeline system in which a mass flow meter is installed, and on the other hand, that oscillations of the pipeline system can also influence the measurement result.

SUMMARY OF THE INVENTION

The object of the invention now is to provide a mass flow meter operating according to the Coriolis principle, in the case of which the problem, previously discussed in detail, which results from the fact that the mass flow meter has only one straight Coriolis measuring tube, is of less consequence.

The mass flow meter in accordance with the invention, in the case of which the problem derived and presented previously in detail is solved, now in the first place and essentially is characterized by the fact that the Coriolis measuring tube is designed as a flow channel of a thick-walled body, in particular a thick-walled tube, that the thick-walled tube has recesses accessible from the outside, reaching very close to the Coriolis measuring tube, that the oscillation generator acts upon the residual material of the thick-walled tubes remaining in the area of the recesses, and that the Coriolis forces or Coriolis oscillations appearing in the area of the residual material of the thick-walled tube are detected by the sensor or the sensors.

In the case of the mass flow meter in accordance with the invention, the mass of the residual material of the thick-walled tube acting as a Coriolis measuring tube as a whole is relatively small in relation to the mass of the thick-walled tube. From this it results that the "center of mass not constant" problem discussed initially does remain qualitatively, but quantitatively has practically no effect. This may be seen as a summary of the advantages achieved by the invention.

In particular, there are now a number of possibilities for designing and further developing the mass flow meter in accordance with the invention. We refer, on the one hand, to the patent claims, and, on the other hand, to the description of the preferred embodiments in connection with the drawing.

DETAILED DESCRIPTION OF ILLUSTRATIVE EMBODIMENTS

The mass flow meter for flowing media in accordance with the invention is one which operates according to the Coriolis principle. In the first place, as a rule, but not necessarily, the mass flow meter in accordance with the invention has a housing not shown in the figures. An at least essentially, as a rule and in the embodiments shown exactly, straight Coriolis measuring tube 1, at least one oscillation generator 2 acting on the Coriolis measuring tube 1, and at least one sensor 3, as a rule two sensors 3, detecting Coriolis forces and/or Coriolis oscillations based on Coriolis forces are functionally necessary to the mass flow meter in accordance with the invention.

As FIGS. 1 to 5 and 7 to 11 show, the Coriolis measuring tube 1 is made as a flow channel of a thick-walled body, namely a thick-walled tube 4. The thick-walled tube 4 has recesses 5 accessible from outside and reaching close to the Coriolis measuring tube 1. In this way, only residual material 6 remains in the areas of the recesses 5 of the thick-walled tube 4; therefore the otherwise thick-walled tube 4 has—at least partially—a relatively small wall thickness in the area of the recesses 5. The oscillation generator 2 acts on the residual material 6 of the otherwise thick-walled tube 4 remaining in the area of the recesses 5. This leads to the fact that the relatively thin-walled residual material 6 of the otherwise thick-walled tube 4 acting as the actual Coriolis measuring tube 1 is made to oscillate, so that Coriolis forces and resulting Coriolis oscillations appear in connection with the mass of a flowing medium. The Coriolis forces, or the Coriolis oscillations based on these Coriolis forces, appearing in the area of the residual material 6 of the otherwise thick-walled tube 4 are detected by each sensor 3 and then evaluated in the usual way.

In the case of the mass flow meter in accordance with the invention, the thick-walled tube 4 can consist of metal, or of a metal alloy, or of plastic, in particular of polytetrafluoroethylene (PTFE), of perfluouro-alkoxy-polymer (PFA), or of polyether etherketone (PEEK).

Figure 9:
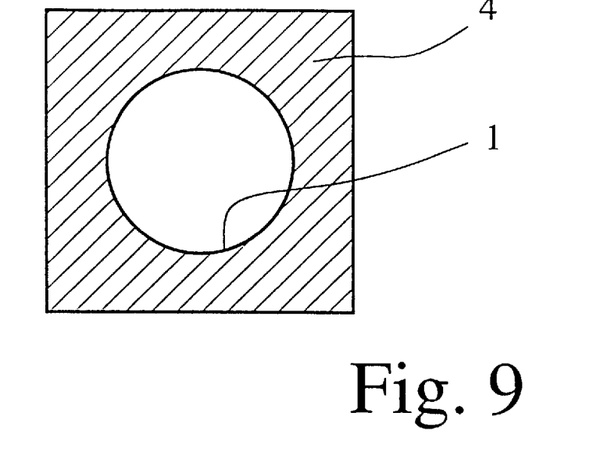
FIG. 9 shows a possible cross-section of a mass flow meter in accordance with the invention.
Figure 10:
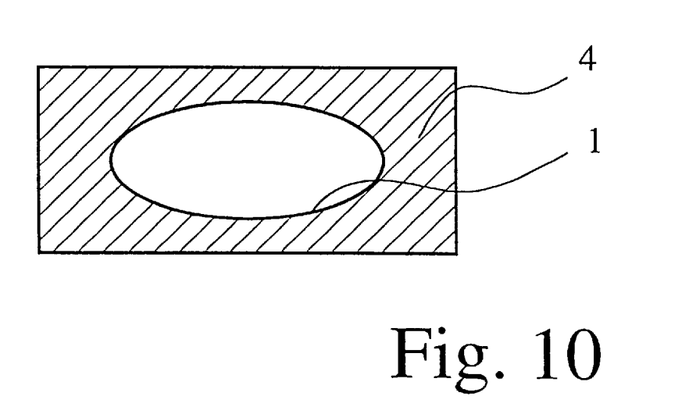
FIG. 10 shows a further possible cross-section of a mass flow meter in accordance with the invention, FIG. 11 again shows a possible cross-section of a mass flow meter in accordance with the invention.
Figure 11:
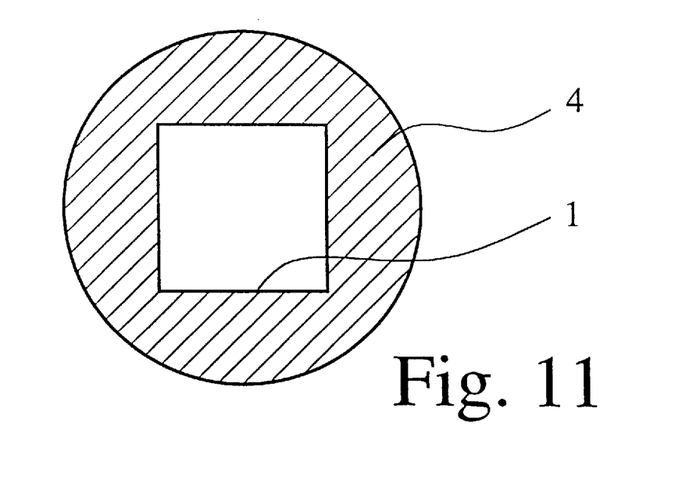

With respect to the geometry of the Coriolis measuring tube 1, and with respect to the geometry of the thick-walled tube 4, the designer carrying out the theory of the invention has considerable freedom here in particular. Both the Coriolis measuring tube 1 as well as the thick-walled tube 4 can have a round, an oval, an elliptical, or a rectangular, in particular square, cross-section. FIGS. 9, 10, and 11 show only as examples different cross-sectional shapes with respect to the Coriolis measuring tube 1 and the thick-walled tube 4.

In the case of mass flow meters which operate according to the Coriolis principle, thus also in the case of the mass flow meter in accordance with the invention, thermal influences can affect the measurement sensitivity and/or the zero point—and thus the measurement accuracy of the flow meter as a whole. Consequently, there is a proposal to provide at least one temperature sensor, T (FIG. 7) in the flow meter in the drawing figures, in order to compensate for thermal influences on the measurement sensitivity and/or on the zero point of the flow meter.

Initially, it was stated that mass flow meters of the type under consideration, therefore also the mass flow meter in accordance with the invention, include at least one oscillation generator 2 acting on the Coriolis measuring tube 1. However, preferably, as also is shown partially in the drawing figures, two oscillation generators 2 are provided and the two oscillation generators 2 are arranged symmetrical to the longitudinal axis of the Coriolis measuring tube 1, respectively to the thick-walled tube 4. In this case, the oscillation generators 2 can be operated in phase or in phase opposition.

There follows the details of the embodiments of mass flow meters in accordance with the invention shown in FIGS. 1 to 8.

Figure 4:
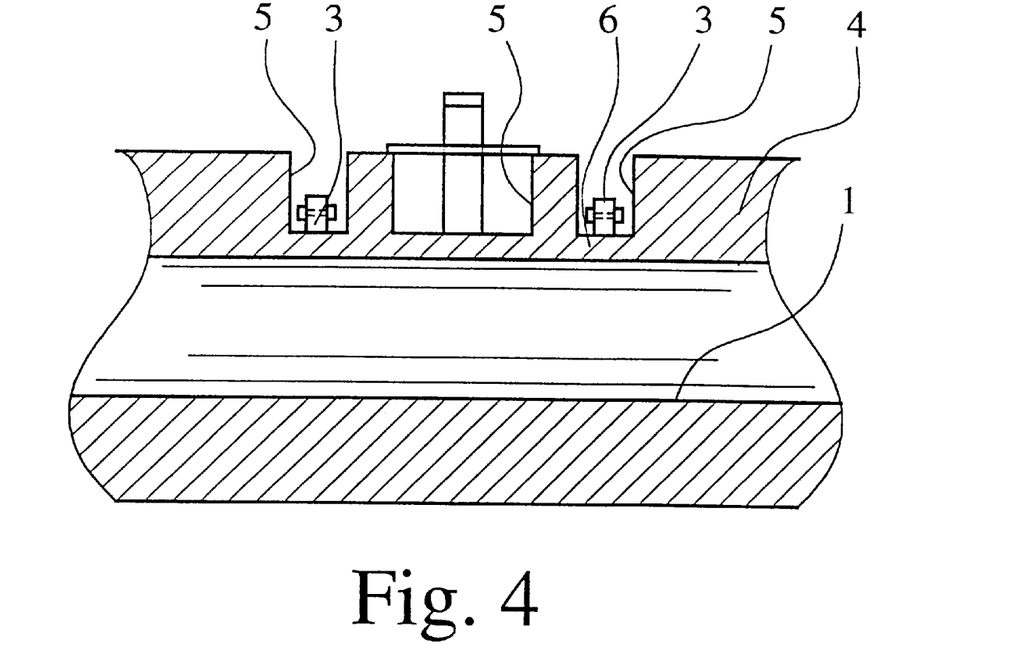
FIG. 4 shows a longitudinal section through a fourth embodiment of a mass flow meter in accordance with the invention.
Figure 5:
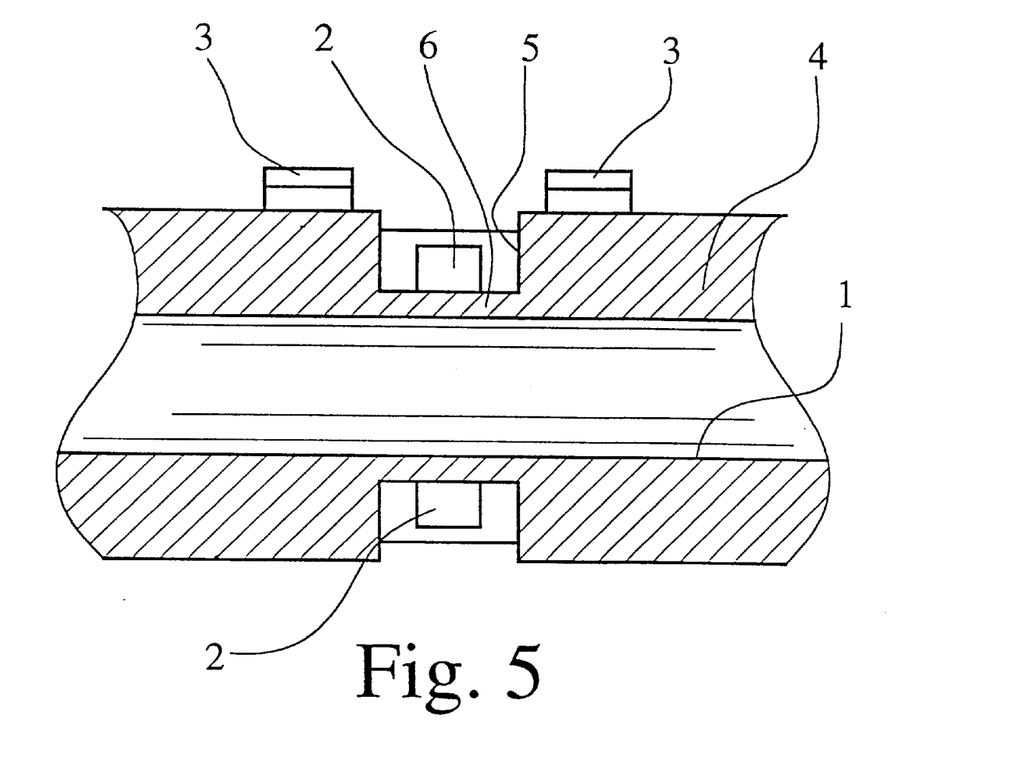
FIG. 5 shows a longitudinal section through a fifth embodiment of a mass flow meter in accordance with the invention.
Figure 6:
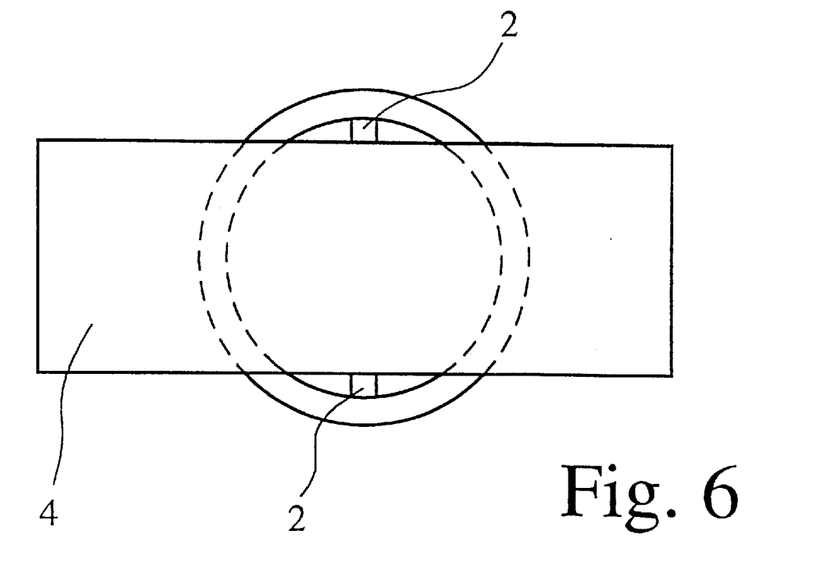
FIG. 6 shows a longitudinal section through a sixth embodiment of a mass flow meter in accordance with the invention.

The theory embodied in the mass flow meter in accordance with the invention, as discussed previously, essentially consists in the fact that the Coriolis measuring tube 1 is made as a flow channel of a thick-walled body, in particular a thick-walled tube 4, and that the thick-walled tube 4 has recesses 5, accessible from outside, reaching relatively close to the Coriolis measuring tube 1, so that only relatively thin-walled residual material 6 remains in the area of the recesses 5. The recesses 5 provided in accordance with the invention can, as is shown in FIG. 5, be realized on one side on the initially thick-walled tube 4, as is shown in FIGS. 1 to 4 and 6 to 8. However, there is also the possibility, as is shown in FIG. 5, of making the recesses 5 on both sides in the otherwise thick-walled tube 4. This is required when, as is also shown in FIG. 5, two oscillation generators 2 are provided and the oscillation generators 2 are to be located symmetrical to the longitudinal axis of the Coriolis measuring tube 1 or of the thick-walled tube 4.

Moreover, in the mass flow meter in accordance with the invention, the oscillation generator 2 (or the two oscillation generators 2) and the sensor(s) 3 can be designed completely differently.

Figure 1:
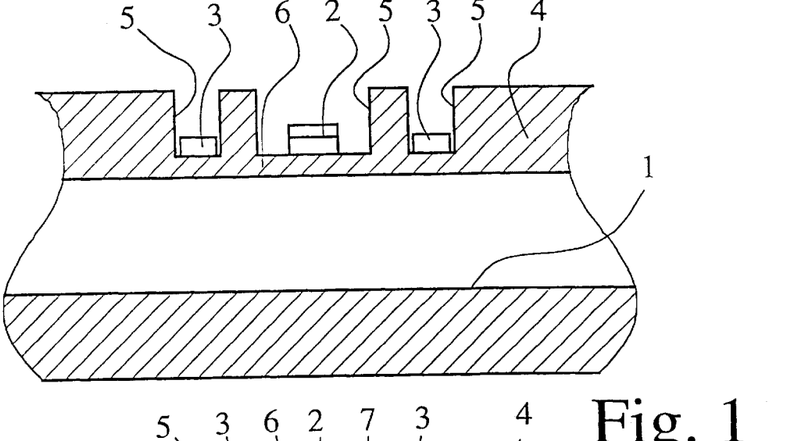
FIG. 1 shows a longitudinal section through a first embodiment of a mass flow meter in accordance with the invention.
Figure 2:
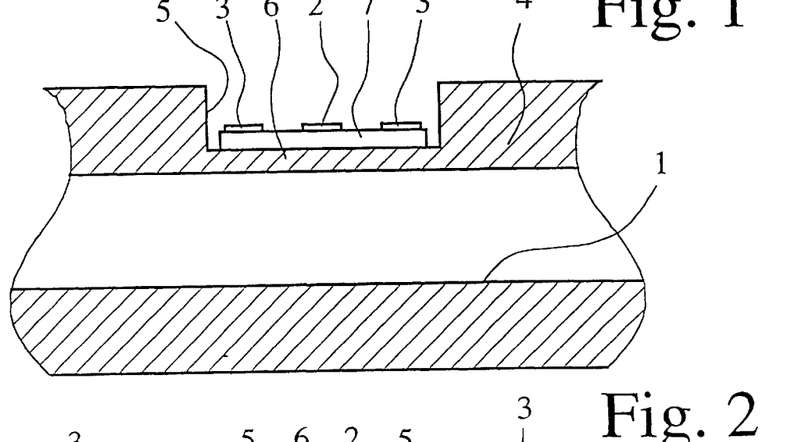
FIG. 2 shows a longitudinal section through a second embodiment of a mass flow meter in accordance with the invention.
Figure 3:
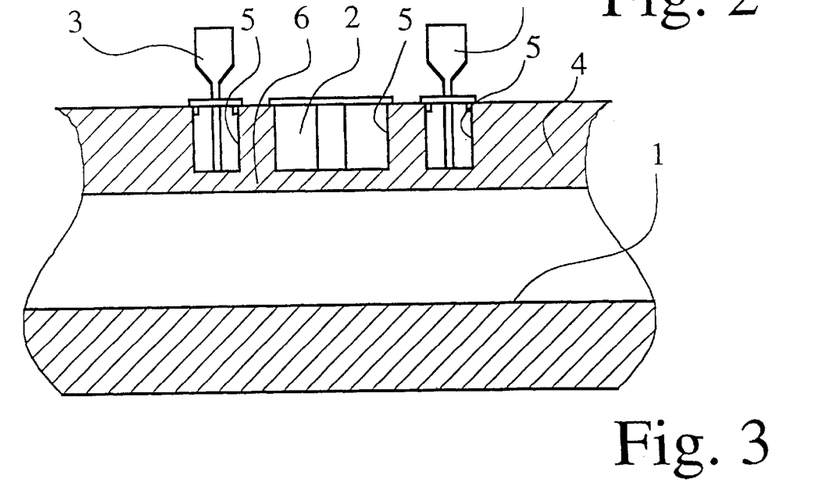
FIG. 3 shows a longitudinal section through a third embodiment of a mass flow meter in accordance with the invention.
Figure 7:
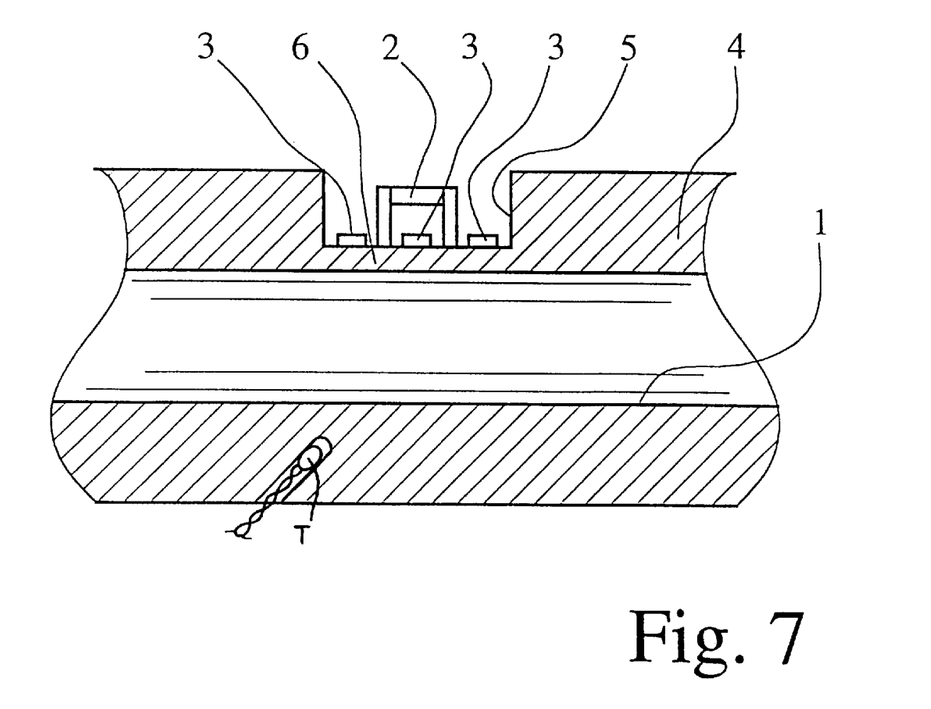
FIG. 7 shows a longitudinal section through a seventh embodiment of a mass flow meter in accordance with the invention.

In the embodiment shown in FIG. 1, the oscillation generator 2 and the sensors 3 are designed conventionally in the broadest sense. In the case of the embodiment shown in FIG. 2, the oscillation generator 2 and the sensors 3 in connection with a common carrier 7 are made out of piezo-material, separate layers for the oscillation generator 2 and the sensors 3 being provided. The embodiment shown in FIG. 3 concerns a magneto-restrictive oscillation generator 2, while the sensors 3 consist of piezo-material and they project out of the recesses 5 of the thick-walled tube 4, so that the sensors 3 are largely decoupled from the temperature of the thick-walled tube 4. FIG. 4 shows an embodiment whose oscillation generator 2 is operated in longitudinal resonance, while the sensors 3 are magneto-dynamic sensors. The embodiment shown in FIG. 5, as already discussed, has two oscillation generators 2 which can be operated either in phase or in phase opposition. It is to be noted here that basically it is also possible to have embodiments of mass flow meters in accordance with the invention, in the case of which one and the same component acts both as an oscillation generator 2 and as a sensor 3. However, in the embodiment shown in FIG. 5, the sensors 3 are designed as ultrasonic transmitters and receivers. The ultrasonic waves emitted by the sensors 3 are introduced into the Coriolis measuring tube 1 and reflected back through the inner wall of the Coriolis measuring tube 1—through an acoustic impedance step change—and received by the sensors 3 again. The Coriolis forces or the Coriolis oscillations resulting therefrom acting on the Coriolis measuring tube 1 can be evaluated by interference measurement. In the case of this embodiment the thick-walled tube 4 preferably consists of a material with a low modulus of elasticity E. In the embodiment shown in FIG. 6, it is made clear that there are two oscillation generators 2 which are located and mechanically coupled on both sides of the thick-walled tube 4. The embodiment shown in FIG. 7 provides a magnetic oscillation generator 2 which excites the Coriolis measuring tube 1, therefore the residual material 6 of the otherwise thick-walled tube 4, in the bending mode. Moreover, FIG. 7 shows an embodiment in the case of which three sensors 3 are provided, it being possible to use the middle sensor 3 for correction or compensation purposes.

Figure 8A:
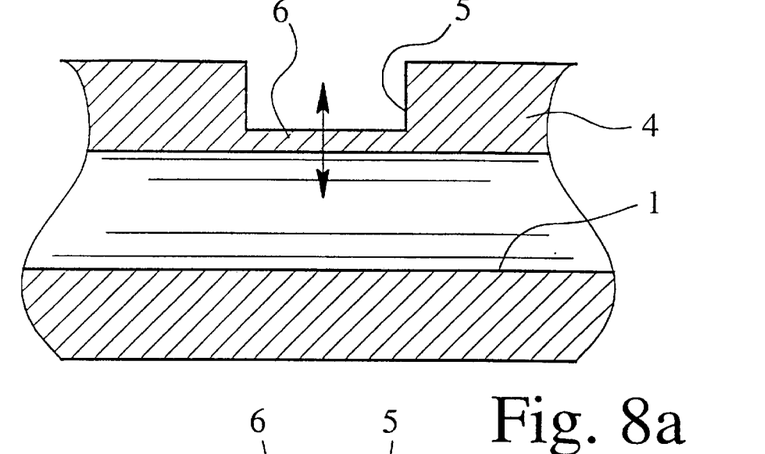
FIGS. 8a to 8c show a longitudinal section through an eighth embodiment of a mass flow meter in accordance with the invention.
Figure 8B:
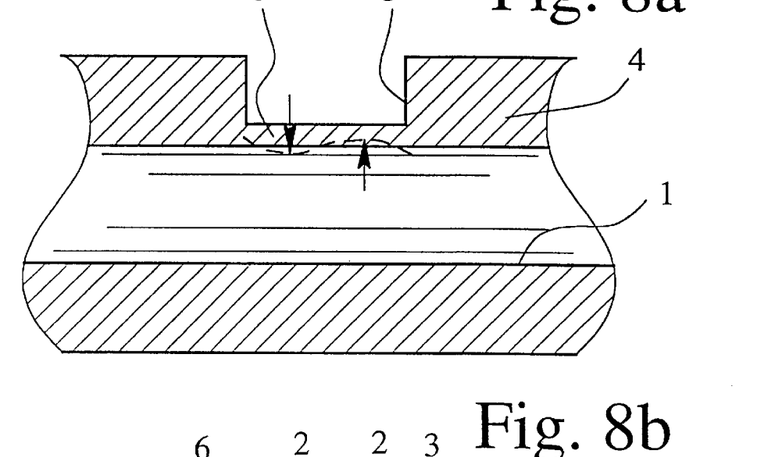
Figure 8C:
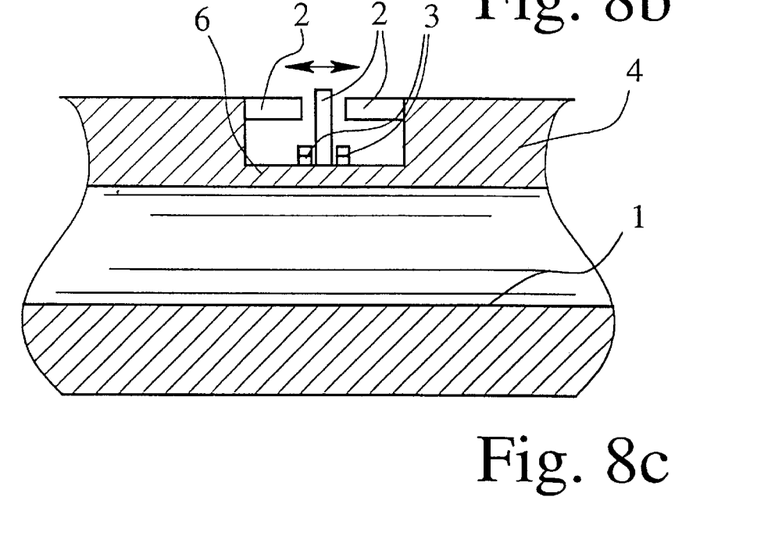

FIGS. 8a, 8b, and 8c, show an embodiment of the mass flow meter in accordance with the invention, in which it is shown that different excitation modes can be realized. One excitation mode is indicated in FIG. 8a, another in FIG. 8b. FIG. 8c shows a concrete embodiment for realizing the excitation mode shown in FIG. 8b. In the case of this embodiment, the oscillation generator 2 is designed to be magnetically inductive. It is immediately clear that this embodiment and application of the oscillation generator 2 lead to the excitation mode shown in FIG. 8b.

Figure 12:
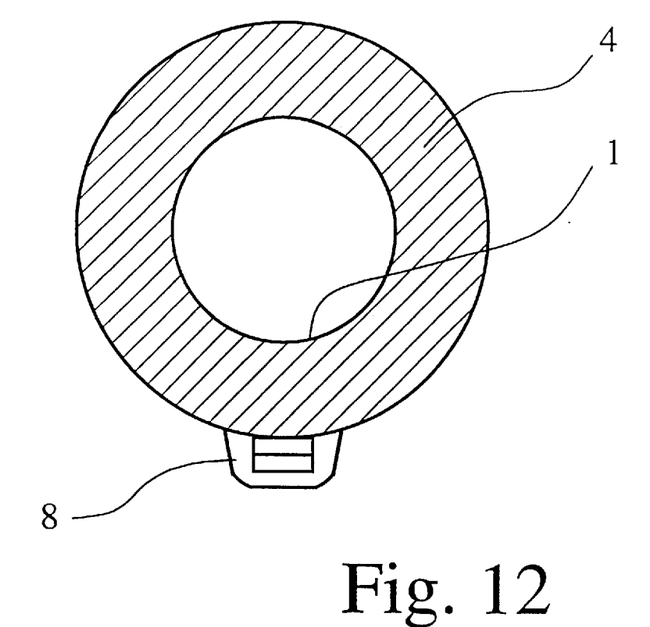
FIG. 12 shows a cross-section through an entirely different embodiment of a mass flow meter in accordance with the invention.
Figure 13:
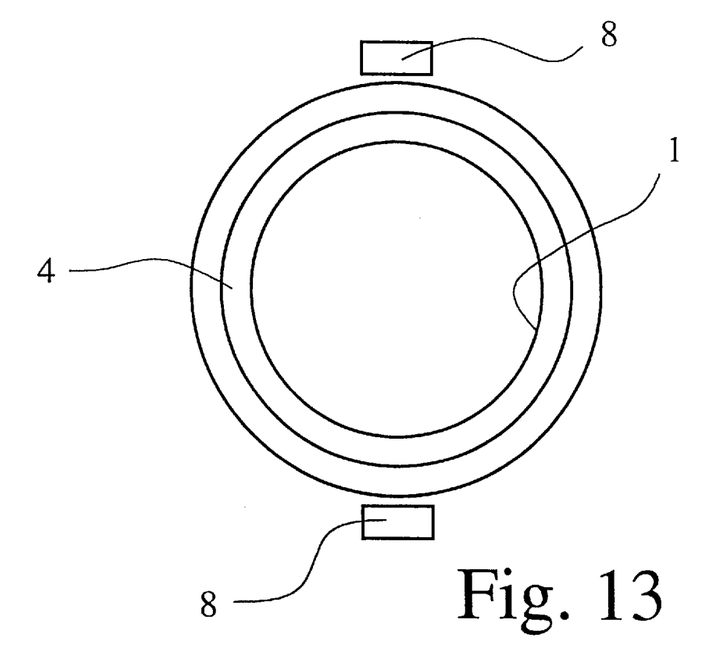
FIG. 13 shows a schematic representation for explaining another entirely different embodiment of a mass flow meter in accordance with the invention.

It has been explained above that, in the case of the mass flow meter in accordance with the invention, the mass of the residual material 6 of the thick-walled tube 4 acting as a Coriolis measuring tube 1 is relatively small in relation to the mass of the thick-walled tube 4 as a whole, and that from this it results that the "center of mass not constant" problem explained initially does remain qualitatively, but quantitatively has practically no effect when the Coriolis oscillations—in the case of a thick-walled tube 4—are decidedly small. This is attainable when, according to a further embodiment of the invention, vibration converters 8 are provided on the outside of the thick-walled tube 4 and the vibration frequency is chosen so that a maximum deflection of the inner wall of the thick-walled tube 4 takes place. FIGS. 12 and 13 show embodiments of the previously described mass flow meter in accordance with the invention, in the case of which the recesses provided in the case of the embodiments of the mass flow meters in accordance with the invention described above are not realized. High cross-currents to the direction of flow, which in connection with the mass of the flowing medium lead to relatively great Coriolis forces, the reaction of which on the inner wall of the thick-walled tube 4 can be detected, appear as a result of the theory of the invention described previously.

Finally, it can be advantageous to adapt the sound frequency to the flowing medium—by control or regulation—so that even-numbered multiples or even-numbered fractions of the wave length in the flowing medium correspond at least approximately to the inner diameter of the Coriolis measuring tube 1 or the distance from one inner wall to the opposite inner wall of the Coriolis measuring tube 1.

What is claimed is:

1. A mass flow meter for flowing media, which operates according to the Coriolis principle, with one at least essentially straight Coriolis measuring tube, with at least one oscillation generator acting on the Coriolis measuring tube, and with at least one sensor detecting at least one of Coriolis forces and Coriolis oscillations based on Coriolis forces, wherein the Coriolis measuring tube has a thick wall (4) defining a flow channel (1), the thick wall (4) has recesses (5) accessible from the outside and reaching very close to the flow channel (1) so as to have residual material (6) between the recesses (5) and the flow channel (1), the oscillation generator (2) acts upon the residual material (6), and the Coriolis forces or Coriolis oscillations appearing in the area of the residual material (6) are detected by said at least one sensor (3).

2. The mass flow meter in accordance with claim 1, wherein the thick-walled tube (4) consists of metal or of a metal alloy.

3. The mass flow meter in accordance with claim 1, wherein the thick-walled tube (4) consists of plastic, in particular of polytetrafluorethylene (PTFE), of perfluoroalkoxy-polymer (PFA), or of polyether etherketone (PEEK).

4. The mass flow meter in accordance with claim 1, wherein the Coriolis measuring tube (1) has a round, an oval, an elliptical, or a rectangular, in particular a square, cross-section.

5. The mass flow meter in accordance with claim 1, wherein the thick-walled tube (4) has a round, an oval, an elliptical, or a rectangular, in particular a square, cross-section.

6. The mass flow meter in accordance with claims 1, wherein at least one temperature sensor is provided for compensation of thermal influences on the measurement accuracy and/or the zero point.

7. The mass flow meter in accordance with claim 1, wherein two oscillation generators (2) are provided and both oscillation generators (2) are arranged symmetrical to the longitudinal axis of the Coriolis measuring tube (1) or the thick-walled tube (4).

8. The mass flow meter in accordance with claim 7, wherein the oscillation generators (2) are operated in phase.

9. The mass flow meter in accordance with claim 7, wherein the oscillation generators (2) are operated in phase opposition.

10. The mass flow meter in accordance with claim 1, wherein the sound frequency is adapted to the flowing medium—by control or regulation—so that even-numbered multiples or even-numbered fractions of the wave length in the flowing medium correspond at least approximately to the inner diameter of the Coriolis measuring tube (1) or the distance from one inner wall to the opposite inner wall of the Coriolis measuring tube (1).

* * * * *